(12) United States Patent
Fan et al.

(10) Patent No.: US 11,647,171 B2
(45) Date of Patent: May 9, 2023

(54) PROJECTION APPARATUS INCLUDING AN ILLUMINATION SYSTEM, A LIGHT VALVE AND A PROJECTION LENS

(71) Applicant: Coretronic Corporation, Hsin-Chu (TW)

(72) Inventors: Chen-Wei Fan, Hsin-Chu (TW); Ming-Tsung Weng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 100 days.

(21) Appl. No.: 17/195,510

(22) Filed: Mar. 8, 2021

(65) Prior Publication Data

US 2021/0289180 A1    Sep. 16, 2021

(30) Foreign Application Priority Data

Mar. 10, 2020   (CN) .......................... 202010160148.7

(51) Int. Cl.
   *H04N 9/31*    (2006.01)
   *G03B 21/20*   (2006.01)
   *G03B 21/16*   (2006.01)

(52) U.S. Cl.
   CPC ......... *H04N 9/3158* (2013.01); *G03B 21/204* (2013.01); *G03B 21/2066* (2013.01); *G03B 21/16* (2013.01)

(58) Field of Classification Search
   CPC .. H04N 9/3158; H04N 9/3102; H04N 9/3161; G03B 21/204; G03B 21/2066; G03B 21/16; G03B 21/14; G03B 21/208
   See application file for complete search history.

(56) References Cited

U.S. PATENT DOCUMENTS

| 9,664,892 B2 | 5/2017 | King et al. |
| 2010/0091252 A1 | 4/2010 | Namba et al. |

(Continued)

FOREIGN PATENT DOCUMENTS

| CN | 102650409 | 8/2012 |
| CN | 106200233 | 12/2016 |

(Continued)

OTHER PUBLICATIONS

Office Action of China Counterpart Application, dated Jan. 18, 2022, pp. 1-9.

(Continued)

*Primary Examiner* — Magda Cruz
(74) *Attorney, Agent, or Firm* — JCIPRNET

(57) ABSTRACT

A projection apparatus includes an illumination system configured to output an illumination beam, a light valve and a projection lens. The illumination system includes a laser light source configured to emit a laser beam and a wavelength conversion element. A first region of the wavelength conversion element includes at least one first and second optical function region. In a first sub-time interval, the first optical functional region guides the laser beam to a first position with a first optical path, wherein the light valve is located at the first position. In the second sub-time interval, the second optical functional region guides the laser beam to a second position with a second optical path, wherein the second position is different from the first position. The projection apparatus of the present invention has good image quality.

16 Claims, 11 Drawing Sheets

(56) References Cited

U.S. PATENT DOCUMENTS

| | | | | |
|---|---|---|---|---|
| 2014/0226306 | A1* | 8/2014 | Khan | H04N 9/3158 362/84 |
| 2015/0124429 | A1* | 5/2015 | Hoehmann | F21V 17/02 362/84 |
| 2019/0227416 | A1* | 7/2019 | Pan | G03B 21/2013 |
| 2019/0235370 | A1* | 8/2019 | Weng | G03B 21/2006 |
| 2019/0346752 | A1* | 11/2019 | Pan | G03B 21/204 |
| 2019/0373227 | A1* | 12/2019 | Pan | H04N 9/3114 |
| 2020/0004120 | A1* | 1/2020 | Chen | G03B 21/00 |
| 2020/0064620 | A1* | 2/2020 | Chen | G03B 21/204 |
| 2020/0073219 | A1* | 3/2020 | Chen | G02B 26/00 |
| 2020/0124952 | A1* | 4/2020 | Guo | G03B 21/208 |
| 2020/0209726 | A1* | 7/2020 | Lin | G03B 21/2066 |
| 2020/0314396 | A1* | 10/2020 | Fan | H04N 9/3152 |
| 2020/0363711 | A1* | 11/2020 | Dai | G03B 21/208 |
| 2020/0371413 | A1* | 11/2020 | Pan | H04N 9/3164 |

FOREIGN PATENT DOCUMENTS

| | | |
|---|---|---|
| CN | 108663879 | 10/2018 |
| CN | 208190833 | 12/2018 |
| CN | 208537894 | 2/2019 |
| CN | 109521633 | 3/2019 |
| CN | 208903065 | 5/2019 |
| CN | 110501867 | 11/2019 |
| CN | 211403090 | 9/2020 |
| EP | 0028750 | 5/1981 |
| JP | 2006115210 | 4/2006 |
| JP | 2016080873 | 5/2016 |
| WO | 2006115210 | 11/2006 |

OTHER PUBLICATIONS

"Search Report of Europe Counterpart Application", dated May 25, 2021, pp. 1-9.

* cited by examiner

PROJECTION APPARATUS INCLUDING AN ILLUMINATION SYSTEM, A LIGHT VALVE AND A PROJECTION LENS

CROSS-REFERENCE TO RELATED APPLICATION

This application claims the priority benefit of China application serial no. 202010160148.7, filed on Mar. 10, 2020. The entirety of the above-mentioned patent application is hereby incorporated by reference herein and made a part of this specification.

BACKGROUND

Technical Field

The invention relates to a projection apparatus.

Description of Related Art

In the current projector market, the pursuit of high-brightness design has become a trend. High-power light-emitting devices are usually used in projectors to achieve high-brightness design. However, when the projector with high-brightness design operates, the operation process thereof generates a large amount of heat. Because the light valve inside the projector will receive the light beam from the high-power light-emitting element and convert it into an image beam. The large amount of thermal energy will also seriously affect the performance and reliability of the light valve. Therefore, a solution is to: at certain timings, dissipating heat by wind generated by oscillating the micro lenses on the light valve back and forth. However, at this timing, the light valve continues to receive light, and the oscillating micro lenses will reflect the light beam to an unexpected position, causing problems of color point shift, color coordinates, and contrast of the color screen, and that would make the quality of the image projected by the current projector be low.

Other objects and advantages of the invention can be further illustrated by the technical features broadly embodied and described as follows.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention is directed to a projection apparatus, which has good image quality.

Other objects and advantages of the invention can be further illustrated by the technical features broadly embodied and described as follows.

In order to achieve one or a portion of or all of the objects or other objects, an embodiment of the invention provides a projection apparatus including an illumination system, a light valve and a projection lens. The illumination system is configured to output an illumination beam. The illumination system includes a laser light source and a wavelength conversion element. The laser light source is configured to emit a laser beam. The wavelength conversion element is disposed on a transmission path of the laser beam, and a first region of the wavelength conversion element includes at least one first optical function region and at least one second optical function region. The light valve is disposed on a transmission path of the illumination beam, and converts the illumination beam into an image beam. The projection lens is disposed on a transmission path of the image beam. In a first sub-time interval of the first time interval, the first optical functional region of the wavelength conversion element enters the transmission path of the laser beam, and the first optical functional region guides the laser beam to a first position with a first optical path, wherein the light valve is located at the first position. In the second sub-time interval of the first time interval, the second optical functional region of the wavelength conversion element enters the transmission path of the laser beam, and the second optical functional region guides the laser beam to a second position with a second optical path, wherein the second position is different from the first position.

In summary, in the projection apparatus of the embodiment of the present invention, in the first sub-time interval of the first time interval, the first optical function region of the wavelength conversion element guides the laser beam through the first optical path to the first position where the light valve is located, so that the light valve converts the laser beam into the image beam to realize the projection function. In the second sub-time interval of the first time interval, the second optical functional region of the wavelength conversion element guides the laser beam through the second optical path to the second position different from the position where the light valve located. The light valve can perform heat dissipation-related operations in the second sub-time interval, and the probability of color point shift is greatly reduced, so the projection apparatus has good image quality.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
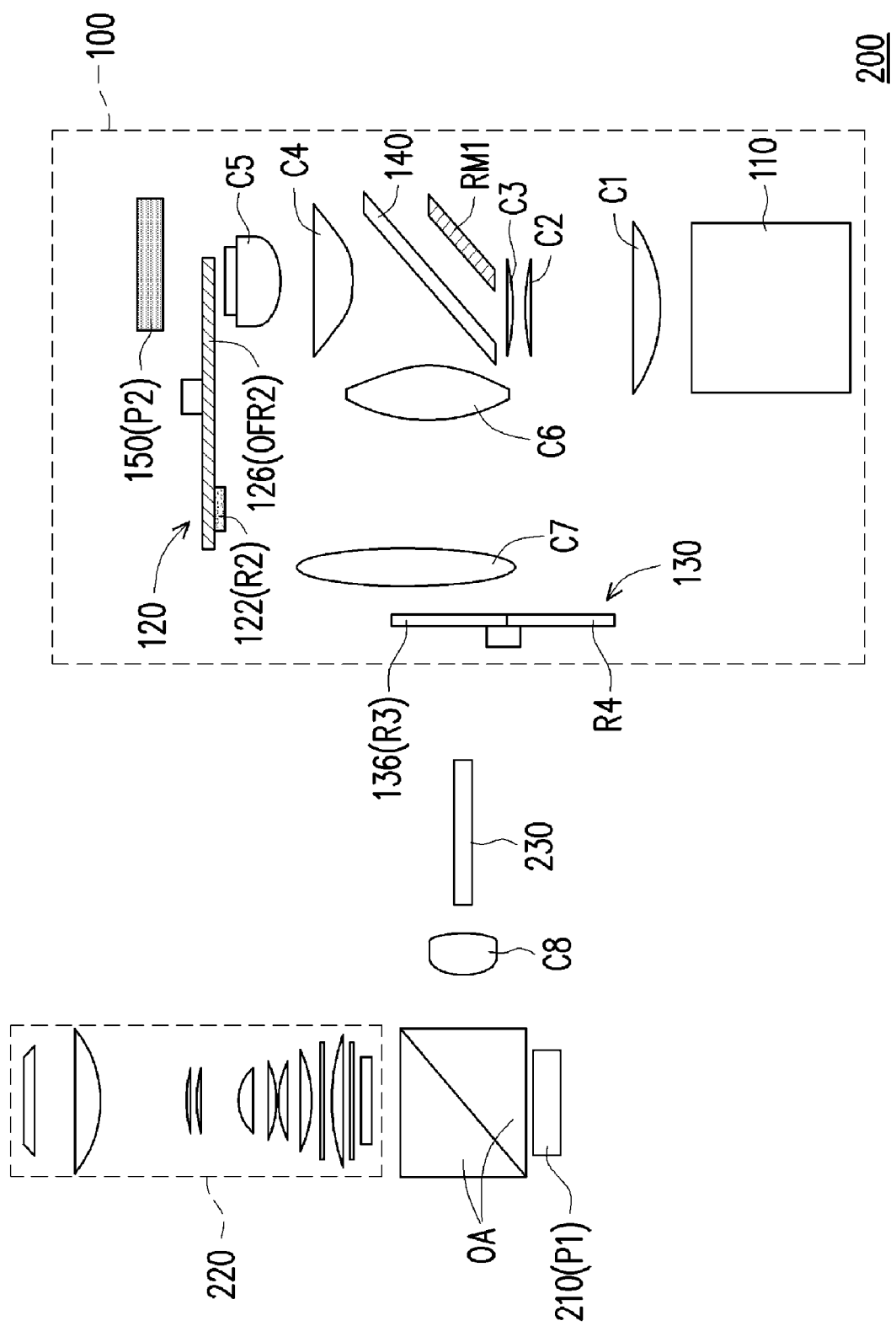
FIG. 1 is a schematic structural diagram of a projection apparatus according to an embodiment of the invention.
Figures 2A, 2B:
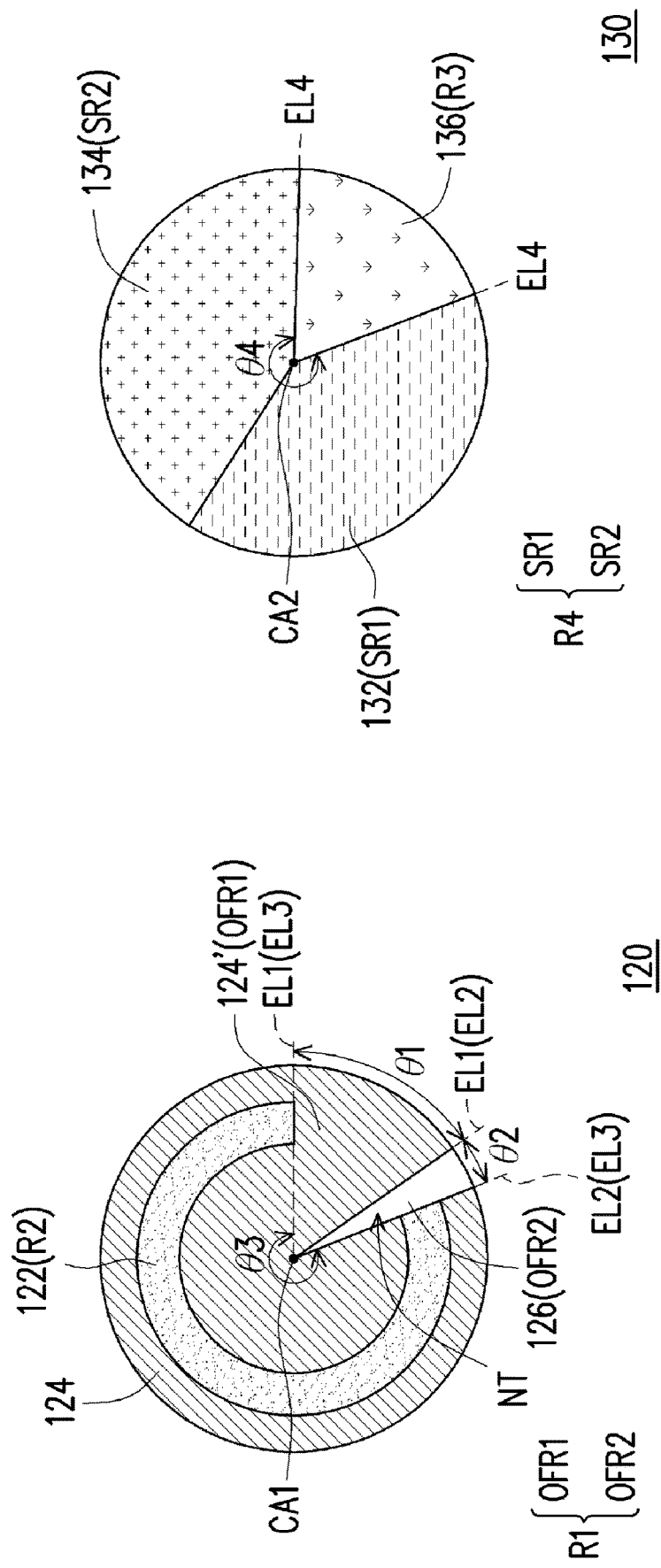
FIG. 2A is a schematic diagram of the wavelength conversion element of FIG. 1.
FIG. 2B is a schematic diagram of the filter wheel of FIG. 1.

FIG. 1 is a schematic structural diagram of a projection apparatus according to an embodiment of the invention. FIG. 2A is a schematic diagram of the wavelength conversion element of FIG. 1. FIG. 2B is a schematic diagram of the filter wheel of FIG. 1.

Please refer to FIG. 1. In the embodiment, the projection apparatus 200 mainly includes an illumination system 100, a light valve 210, a projection lens 220, and a light homogenizing element 230. The illumination system 100 mainly includes a laser light source 110, a wavelength conversion element 120, a filter wheel 130 and a beam splitting element 140. The above components will be explained in detail in the following paragraphs.

Firstly, the components of the illumination system 100 are introduced as follows.

The laser light source 110 generally refers to a light emitting source or light emitting source assembly capable of emitting a laser beam BL. The laser light source 110 may be a single laser diode (Laser Diode, LD), or a light emitting source assembly including a plurality of laser diodes, mirrors, or lenses, but the invention is not limited thereto. In the embodiment, the laser light source 110 is, for example, a blue laser light source, and the laser beam BL is, for example, a blue laser beam.

A main function of wavelength conversion element 120 is to convert a short-wavelength beam passing through the wavelength conversion element 120 into a long-wavelength beam relative to the short-wavelength beam. Please refer to FIG. 2A. In the embodiment, the type of the wavelength conversion element 120 is, for example, a first phosphor wheel, and it can output the laser beam BL as different color beams at different time intervals. The wavelength conversion element 120 includes a wavelength conversion substance 122, a reflective rotating plate 124, and a light-transmitting element 126. The wavelength conversion substance 122 is, for example, a photoluminescent substance, which is, for example, a fluorescent gel layer or quantum dots, but is not limited thereto. In this embodiment, the wavelength conversion substance 122 is a yellow fluorescent glue layer. The yellow fluorescent glue layer refers to a layer formed by mixing the yellow phosphor powder that can convert blue light wavelength to yellow light wavelength into the colloid. The reflective rotating plate 124 is, for example, a rotating plate with a reflective function. For example, the reflective rotating plate 124 is made of aluminum and has a reflective function, or the reflective rotating plate 124 may have a highly reflective coating. The reflective rotating plate 124 has a notch NT, and the light-transmitting element 126 is located at the notch NT. The light-transmitting element 126 includes, for example, glass or air, but the invention is not limited thereto. The light-transmitting element 126 is air which means that no object is disposed in the notch NT. The wavelength conversion substance 122 is disposed on the reflective rotating plate 124 in a ring-shaped manner. No wavelength conversion substance 122 is provided on a portion 124' of the reflective rotating plate 124 and the light-transmitting element 126.

In addition, the wavelength conversion element 120 has a first and a second regions R1, R2 connected to each other. In detail, the first region R1 includes, for example, a first and a second optical functional regions OFR1, OFR2. The first region R1 is defined by, for example, a portion 124' of the reflective rotating plate 124 and the light-transmitting element 126. The first region R1 is defined by, for example, both a portion 124' of the reflective rotating plate 124 and the light-transmitting element 126, wherein a portion 124' of the reflective rotating plate 124 defines a first optical functional region OFR1, and a light-transmitting element 126 defines a second optical functional region OFR2. In other words, the first optical functional region OFR1 is a light reflecting region. The second optical functional region OFR2 is the light penetrating region. The second region R2 is, for example, defined by the wavelength conversion substance 122. In the following paragraphs, the detailed optical mechanism of the first and second regions R1 and R2 will be explained.

The main function of filter wheel 130 is, for example, to further divide the color light beam from the wavelength conversion element 120 into three color lights beam. Please refer to FIG. 2B. In this embodiment, the filter wheel 130 includes a red light filter 132, a green light filter 134 and a blue light filter 136, wherein the red light filter 132 is capable of being passed by the red light and filter out other colored lights, the green light filter 134 is capable of being passed by the green light and filter out other colored lights, and the blue light filter 136 is capable of being passed by the blue light and filter out other colored lights. In other embodiments, the blue light filter 136 can also be replaced by a light-transmitting element or a light-transmitting element doped with scattering particles, the invention is not limited to this.

In other embodiments, the filter wheel 130 has a third and a fourth regions R3 and R4, wherein the third region R3 is defined by the blue light filter 136 and the fourth region R4 is defined by the red light filter 132 and the green light filter 134. In more detail, the fourth region R4 further includes a first and a second subregions SR1, SR2, wherein the first subregion SR1 is defined by the red light filter 132, and the second subregion SR2 is defined by the green light filter 134. In the following paragraphs, the optical mechanism of the third and fourth regions R3 and R4 will be explained.

The beam splitting element 140 generally refers to an optical element having a beam splitting function. In the embodiment, the beam splitting element is a Dichroic Mirror (DM), which has wavelength selectivity and may be a color separator used to separate beams according to wavelength/color. However, the invention is not limited thereto. In the embodiment, the beam splitting element 140 is designed to allow a blue beam to penetrate and is adapted to reflect a yellow beam.

The light absorbing element 150 generally refers to an optical element having the ability to absorb light beams. The light absorbing element 150 may be an object coated with black paint, but the invention is not limited thereto.

The light valve 210 includes Digital Micro-mirror Device (DMD). When the light valve 210 is energized and actuated, air current which is caused by the oscillation of the micro lens contributes heat dissipation of the light valve 210.

The projection lens 220 of the embodiment of the invention is, for example, a combination of one or a plurality of optical lenses having refracting power, and the optical lenses, for example, include various combinations of non-planar lenses such as a biconcave lens, a biconvex lens, a convex-concave lens, a concave-convex lens, a plano-convex lens, a plano-concave lens, etc.

In addition, those skilled in the art can selectively add one or more optical adjustment elements in the projection apparatus 200 to adjust the optical path or optical properties in the projection apparatus 200 according to requirements, wherein the optical prism, mirror or other suitable optical adjustment element, the invention is not limited to this. In this embodiment, the projection apparatus 200 is exemplarily provided with one or more lenses C1 to C8, a reflector RM1, or an optical prism group OA, but the invention is not limited thereto.

Figure 3A:
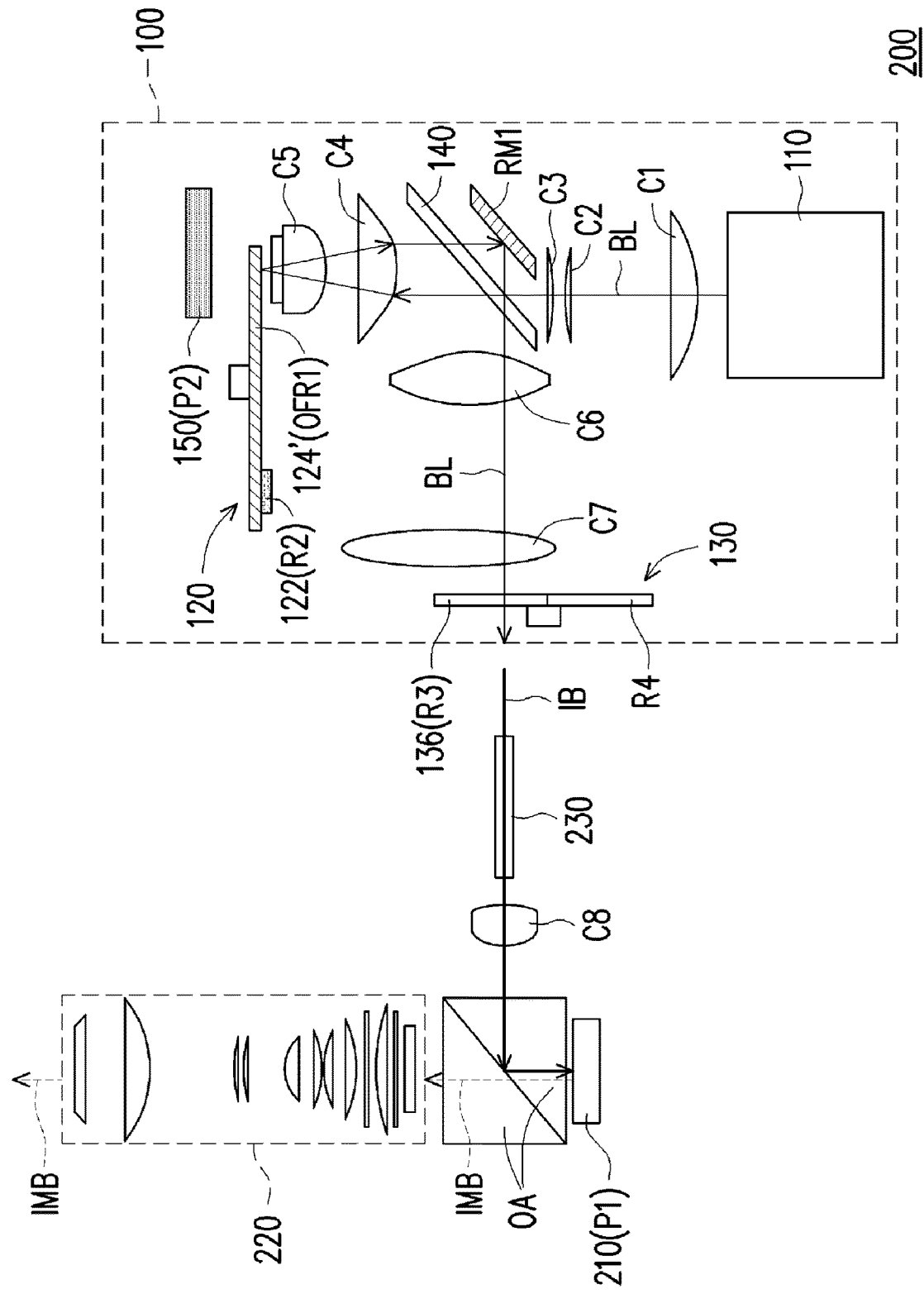
FIG. 3A is a schematic diagram of the optical path of the projection apparatus of FIG. 1 in a first sub-time interval of the first time interval.
Figure 3B:
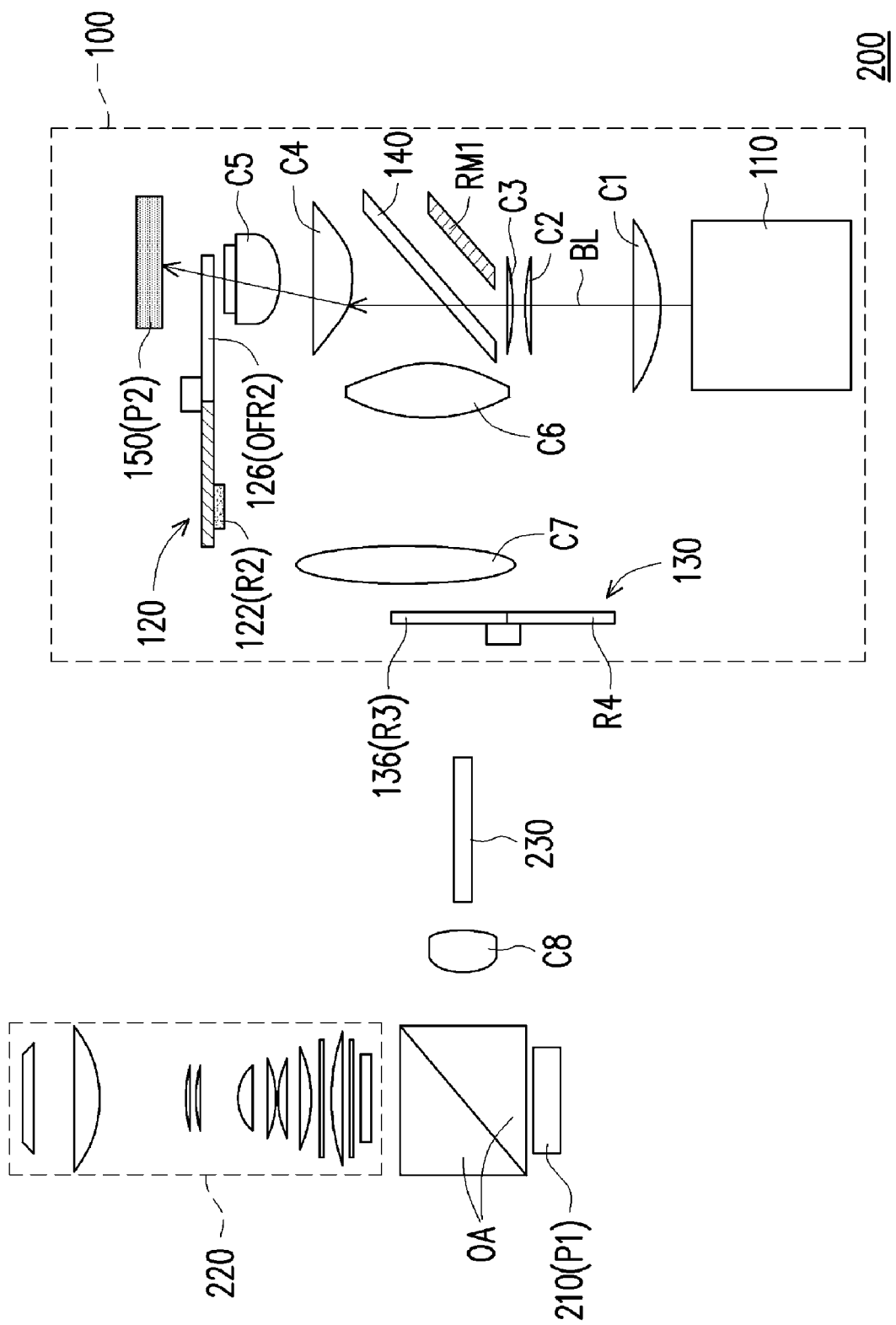
FIG. 3B is a schematic diagram of the optical path of the projection apparatus of FIG. 1 in the second sub-time interval of the first time interval.
Figure 3C:
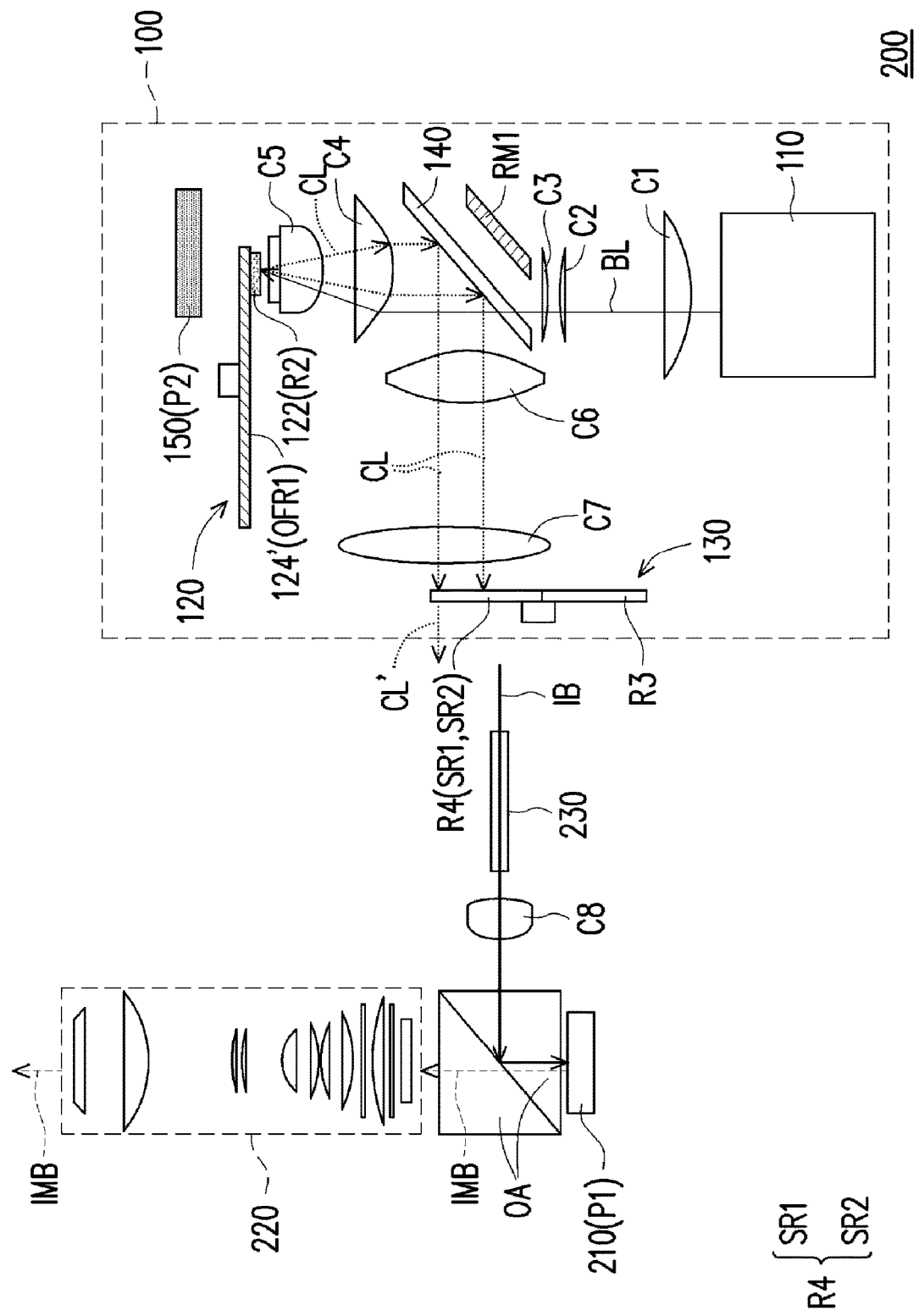
FIG. 3C is a schematic diagram of the optical path of the projection apparatus of FIG. 1 in a second time interval.

FIG. 3A is a schematic diagram of the optical path of the projection apparatus of FIG. 1 in a first sub-time interval of the first time interval. FIG. 3B is a schematic diagram of the optical path of the projection apparatus of FIG. 1 in the second sub-time interval of the first time interval. FIG. 3C is a schematic diagram of the optical path of the projection apparatus of FIG. 1 in a second time interval.

The arrangement relationship between the above components will be explained in detail with FIG. 3A to FIG. 3C in the following paragraphs, FIG. 3A to FIG. 3C will be used to explain in detail the arrangement relationship between the above components.

Please refer to FIG. 3A to FIG. 3C, the wavelength conversion element 120 is disposed on the transmission path of the laser beam BL. The filter wheel 130 is disposed on the transmission path of the light beam (laser beam BL or converted beam CL) coming from the wavelength conversion element 120. The beam splitting element 140 is disposed on the transmission path of the laser beam BL and the transmission path of the light beam coming from the wavelength conversion element 130, and is located between the wavelength conversion element 120 and the laser light sources 110. The light absorbing element 150 is disposed beside the wavelength conversion element 120, that is, the wavelength conversion element 120 is located between the light absorbing element 150 and the beam splitting element 140. The light homogenizing element 230 is disposed on the transmission path of the illumination beam IB. The light valve 210 is disposed on the transmission path of the illumination beam IB. The projection lens 220 is disposed on the transmission path of the image beam IMB. It should be noted that the position of the light valve 210 described above is called the first position P1, and the position of the light absorbing element 150 is called the second position P2.

The optical effect of the projection apparatus 200 of the embodiment will be described in detail with FIGS. 3A to 3C in the following paragraphs.

Refer to the FIGS. 2A to 2B, in different time intervals, the wavelength conversion element 120 and the filter wheel 130 are rotated synchronously to make the first region R1 and the third region R3 correspond to each other, and make the second region R2 and the fourth region R4 correspond to each other in the second time interval.

In detail, the first time interval is divided into a first sub-time interval and a second sub-time interval. FIG. 3A and FIG. 3B will be used to illustrate the optical effects of the projection apparatus 100 in the first and second sub-time intervals in the following paragraphs, respectively.

Please refer to FIG. 3A firstly. in the first sub-time interval of the first time interval, the wavelength conversion element 120 rotates to make the first optical functional region OFR1 of the first region R1 thereof enter the transmission path of the laser beam BL, and the filter wheel 130 rotates to make the third region R3 thereof enter on the transmission path of the light beams coming from the first optical functional region OFR1 of the first region R1 of the wavelength conversion element 120 due to its rotation. In detail, after the laser beam BL is emitted by the laser light source 110, it sequentially penetrates the lenses C1 to C3 and the beam splitting element 140. The laser beam BL penetrates the lens C4 from one side of the lens C4 (the main beam of the laser beam BL penetrates the lens C4 from a position deviated from the optical axis of the lens C4) and penetrates the lens C5 so as to transmit to the first optical functional region OFR1 of the first region R1 of the wavelength conversion element 120. The reflective rotating plate 124' in the first optical functional region OFR1 reflects the laser beam BL, so as to guide the laser beam BL to the first position P1 where the light valve 210 is located with the first optical path.

The first optical path is described as follows in detail. The reflected laser beam BL then penetrates the lens C5, penetrates the lens C4 from the other side of the lens C4 (i.e. a position where the reflected laser beam BL leaving lens C4 is mirror symmetry to the position where the laser beam BL enters the lens C4), penetrates the beam splitting element 140, and then transmits to the reflector RM1. The reflector RM1 reflects the laser beam BL again, so as to make the laser beam BL penetrate the beam splitting element 140, the lenses C6, C7 and the laser beam BL transmits to the third region R3 of the filter wheel 130. After the laser beam BL penetrates the blue light filter 136 in the third region R3, then the laser beam BL is outputted to the illumination system 100, wherein the first and third regions R1 and R3 are configured to output a blue light beam, which may also be called a blue region. In this time interval, the blue beam is served as the illumination beam IB. Next, the illumination light beam IB enters the light homogenizing element 230 and is homogenized by the light homogenizing element 230, and then is guided to the first position P1 (i.e, the position where the light valve 210 located) by the optical prism group OA. In the first sub-time interval, a plurality of micro lenses (not shown) in the light valve 210 are respectively subjected to an image control signal to determine the deflection status of the individual micro lenses, thereby converting the illumination beam IB into an image beam IMB. The image beam IMB penetrates the optical prism group OA and is transmitted to the projection lens 220. The projection lens 220 transmits the image beam IMB to a projection medium (such as a projection screen or a wall).

Please refer to FIG. 3B, in the second sub-time interval of the first time interval, the wavelength conversion element 120 rotates to make the second optical functional region OFR2 of the first region R1 thereof enter the transmission path of the laser beam BL. At this time, the third region R3 of the filter wheel 130 is still located on the transmission path of the light beam coming from the wavelength conversion element 120. After the laser beam BL is emitted by the laser light source 110, it sequentially penetrates the lenses C1 to C3 and the beam splitting element 140. The laser beam BL penetrates the lens C4 from one side of the lens C4 and passes through the lens C5 to be transmitted to the second optical functional region OFR2 of the wavelength conversion element 120. The light-transmitting element 126 in the second optical functional region OFR2 guides the laser beam BL to the second position P2 which is different from the first position P1 with the second optical path.

The second optical path is described as follows in detail. The laser beam BL penetrates the light-transmitting element 126 in the second optical functional region OFR2 and is transmitted to the light-absorbing element 150. The light absorbing element 150 absorbs the laser beam BL. During the second sub-time interval, the plurality micro lenses in the light valve 210 are oscillated back and forth, and the air current caused by the oscillation is used to dissipate heat. It is worth mentioning that the plurality micro lenses of the light valve 210 at this time are not oscillated according to the image signal, but are based on a predetermined signal to allow the plurality micro lenses to perform specific oscillations, such as oscillations at a specific frequency or a specific time.

For the above reasons, during the second sub-time interval, if the second optical functional region OFR2 acts like the reflective rotating plate 124' in the first optical functional region OFR1 in the known technology, the laser beam BL is reflected and transmitted to the light valve 210. Because the plurality micro lenses of the light valve 210 at this time are not oscillated according to the image signal, this phenomenon will cause stray light, that is to say, the light beam which causes the color point shift may enter the projection lens 220. The probability of color point shift is greatly reduced, which affects the quality of the image.

With the optical path design of FIG. 3B of the present invention, in the second sub-time interval, the light absorbing element 150 absorbs the laser beam BL to avoid the formation of stray light.

Please refer to FIG. 3C, in the second time interval, the wavelength conversion element 120 rotates to make the second region R2 to enter the transmission path of the laser beam BL, and the filter wheel 130 rotates to make fourth region R4 enter the transmission path of the light beam coming from the second region R2 of the wavelength conversion element 120. After the laser beam BL is emitted by the laser light source 110, it sequentially penetrates the lenses C1 to C3 and the beam splitting element 140. The laser beam BL penetrates the lens C4 from one side of the lens C4, penetrates the lens C5 to transmit to the second region R2, and excites the wavelength conversion substance 122 in the second region R2. The wavelength conversion substance 122 converts the laser beam BL into a converted beam CL. After the converted light beam CL penetrates the lenses C5 and C4, it is reflected by the beam splitting element 140 so as to make it to penetrates the lenses C6 and C7 and is transmitted to the fourth region R4 of the filter wheel 130. When the converted light beam CL is transmitted to the first sub-region SR1 in the fourth region R4, the red light filter 132 in the first sub-region SR1 will allow the red light beam in the converted light beam CL to pass therethrough and filter out other colored light so as to output red light. When the converted light beam CL is transmitted to the second sub-region SR2 in the fourth region R4, the green light filter 134 in the second sub-region SR2 will allow the green light beam in the converted light beam CL pass therethrough and filter out other colored light so as to output green light. The second region R2 is configured to output yellow light and can be called a yellow light region. The first and second sub-regions SR1 and SR2 of the fourth region R4 are configured to output red light and green light respectively, so they can be respectively called red light region, green light region. During this time interval, the converted light beam CL' filtered by the filter wheel 130 is served as the illumination beam IB. In the second time interval, the light path of the illumination beam IB and the operating mechanism of the light valve 210 are similar to the illumination beam IB and the light valve 210 in the first sub-time interval, and will not be repeated here.

According to the above, in the projection apparatus of the embodiment of the present invention, in the second sub-time interval for the light valve 210 to dissipate heat, the second optical functional region OFR2 of the wavelength conversion element 120 guides the laser beam BL, for example, by the penetration function thereof so as to make the laser beam BL transmit to a second position P2 different from the first position P1 where the light valve is located, so that the light beam that causes color point shift may not be incident on the projection lens 220. The probability of color point shift is greatly reduced, and therefore; the projection apparatus has good image quality.

It should be noted that that a part of contents of the aforementioned embodiment is also used in the following embodiment, wherein the same reference numbers denote the same or like components, and descriptions of the same technical contents are omitted. The aforementioned embodiment can be referred for descriptions of the omitted parts, and detailed descriptions thereof are not repeated in the following embodiment.

Figure 4:
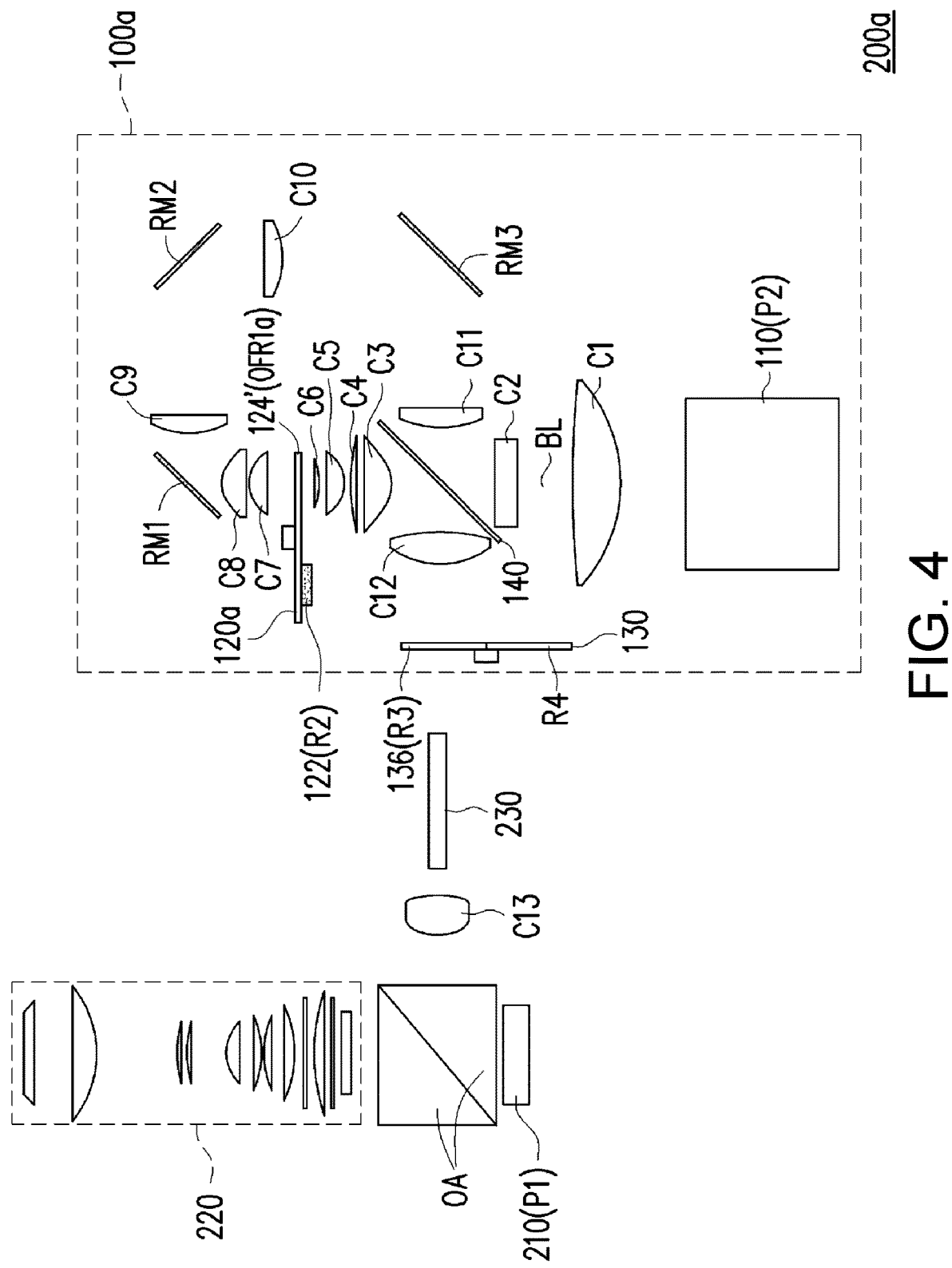
FIG. 4 is a schematic structural diagram of a projection apparatus according to an embodiment of the invention.
Figure 5:
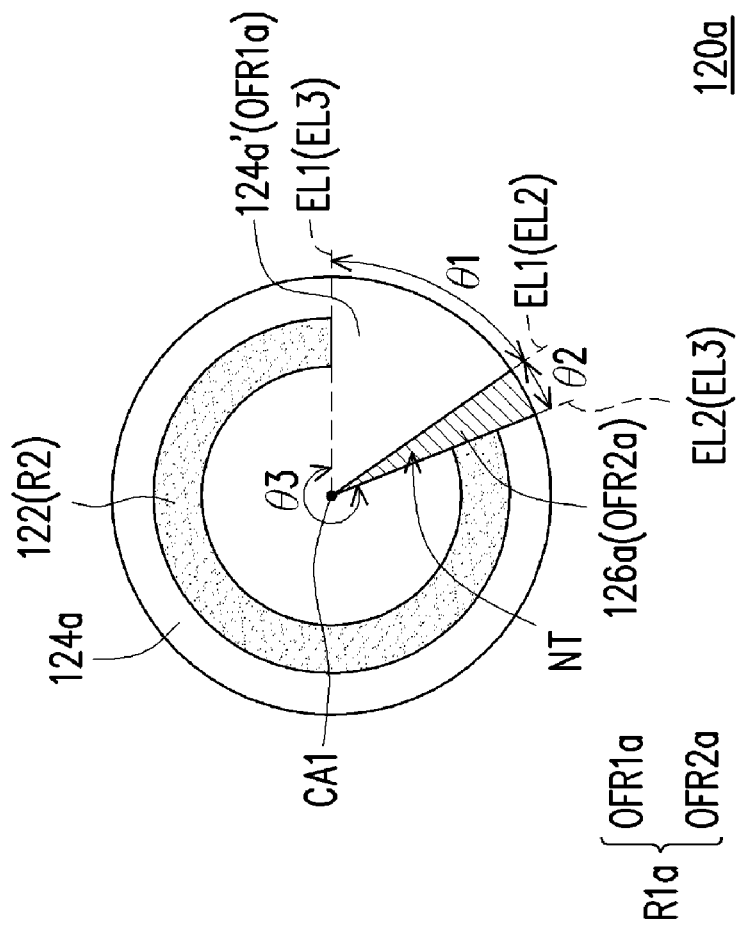
FIG. 5 is a schematic diagram of the wavelength conversion element of FIG. 4.

FIG. 4 is a schematic structural diagram of a projection apparatus according to an embodiment of the invention. FIG. 5 is a schematic diagram of the wavelength conversion element of FIG. 4.

Please refer to FIG. 4. The projection apparatus 200a of this embodiment is substantially similar to the projection apparatus 200. The main difference is lies in that: the type of the wavelength conversion element 120a in the illumination system 100a is the second fluorescent wheel. Please refer to FIG. 5. In detail, The wavelength conversion element 120a includes a wavelength conversion substance 122. The wavelength conversion substance 122 is disposed on a wavelength conversion area of a reflection wheel (second region R2). The reflection wheel includes non-wavelength conversion area (reflective element 126a). The wavelength conversion element 120a includes light-transmitting area (portion 124a' of the light-transmitting rotating plate 124a).

The light-transmitting rotating plate 124a is, for example, a turntable having a light-transmitting function, and it also has a notch NT. The reflective element 126a is located at the notch NT. The wavelength conversion substance 122 is provided on the light-transmitting rotating plate 124a in a ring-shaped manner, and a portion 124a' of the light-transmitting rotating plate 124a and the reflective element 126a are not provided with the wavelength conversion substance 122.

The first region R1a is defined by, for example, a portion 124a' of the light-transmitting rotating plate 124a and the reflective element 126a, wherein the portion 124a' of the light-transmitting rotating plate 124a defines the first optical functional region OFR1a, and the reflecting element 126a defines the second optical functional region OFR2a. In other words, the first optical functional region OFR1a is a light penetrating region. The second optical functional region OFR2a is a light reflecting region. The second region R2 is defined by the wavelength conversion substance 122, for example. In the following paragraphs, the detailed optical actuation mechanism of the first and second regions R1a and R2a will be explained.

In addition, the number of lenses and reflectors in the projection apparatus 200a is also slightly adjusted.

Figure 6A:
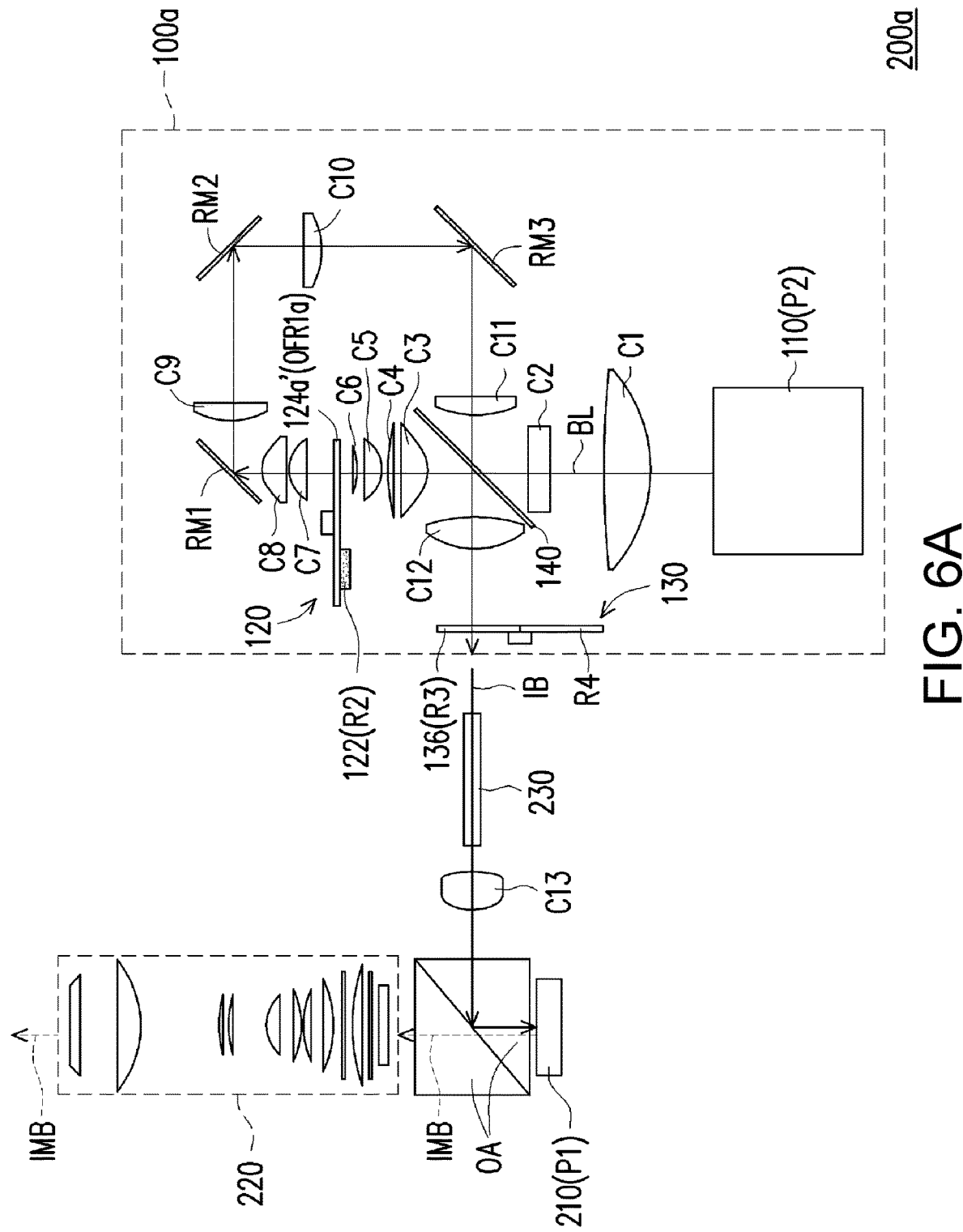
FIG. 6A is a schematic diagram of the optical path of the projection apparatus of FIG. 4 in a first sub-time interval of the first time interval.
Figure 6B:
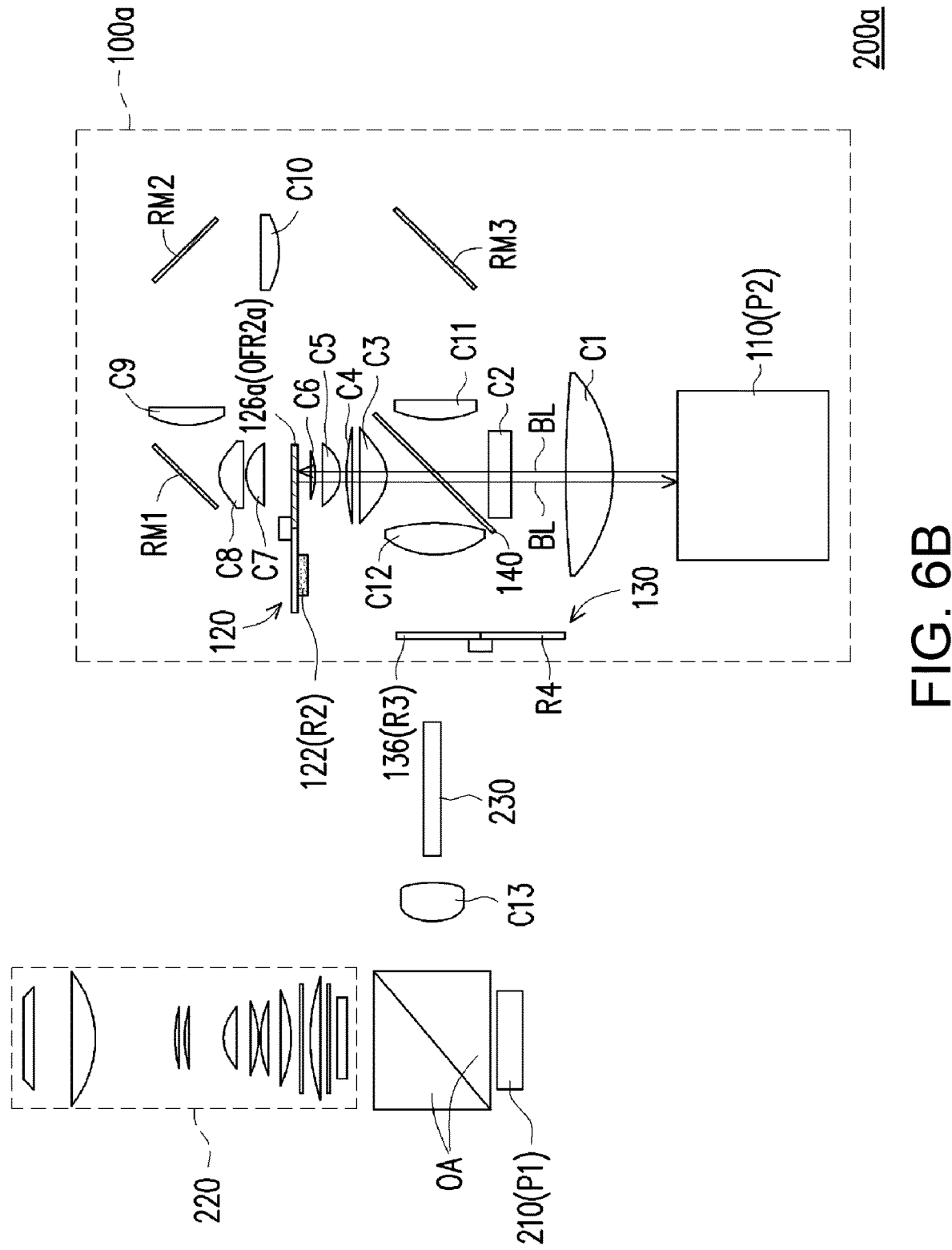
FIG. 6B is a schematic diagram of the optical path of the projection apparatus of FIG. 4 in the second sub-time interval of the first time interval.
Figure 6C:
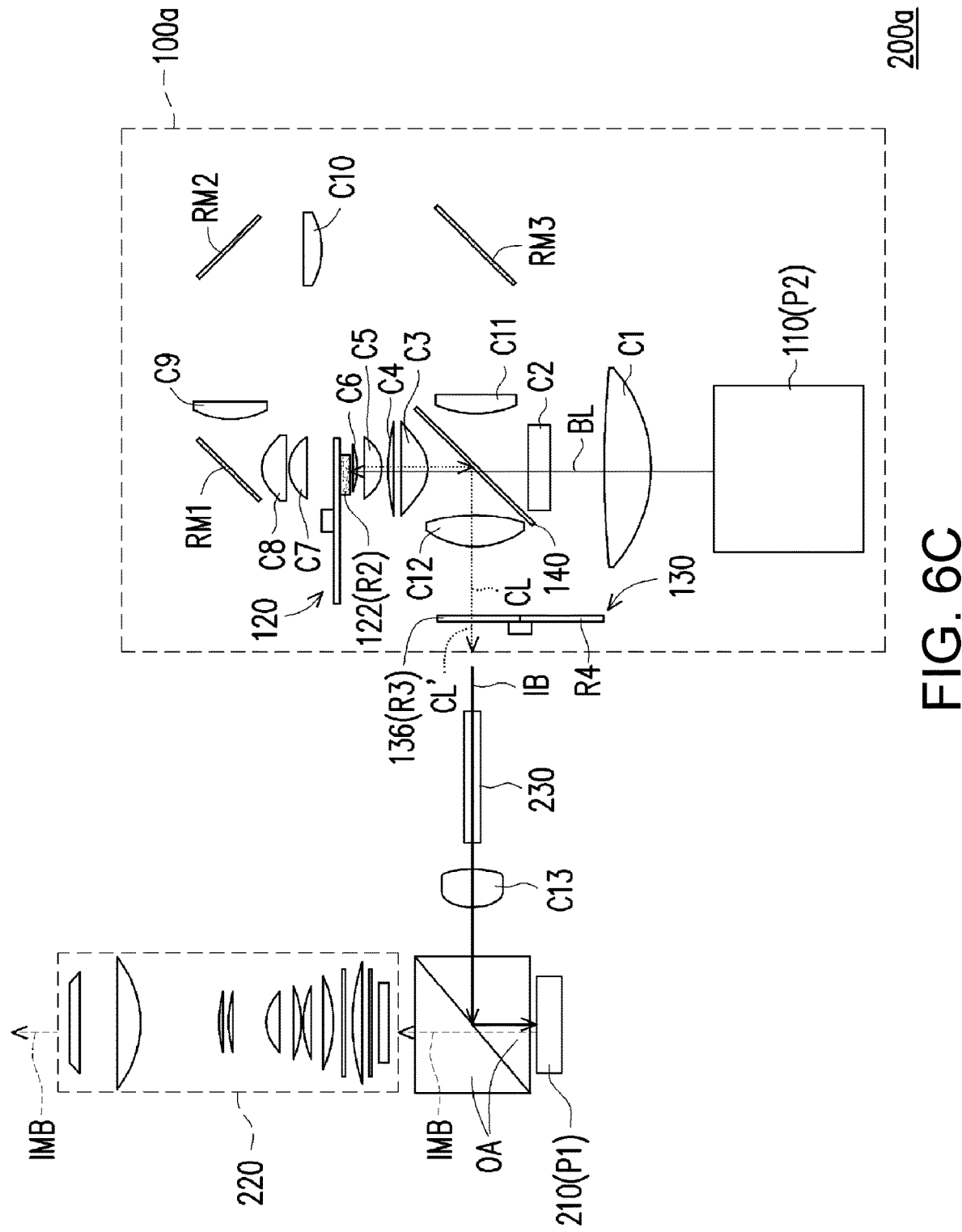
FIG. 6C is a schematic diagram of the optical path of the projection apparatus of FIG. 4 in a second time interval.

FIG. 6A is a schematic diagram of the optical path of the projection apparatus of FIG. 4 in a first sub-time interval of the first time interval. FIG. 6B is a schematic diagram of the optical path of the projection apparatus of FIG. 4 in the second sub-time interval of the first time interval. FIG. 6C is a schematic diagram of the optical path of the projection apparatus of FIG. 4 in a second time interval.

The optical effect of the projection apparatus 200a of this embodiment will be described in detail in the following paragraphs with reference to FIGS. 6A to 6C.

Please refer to FIG. 6A. In the first sub-time interval of the first time interval, the wavelength conversion element 120a rotates to make the first optical functional region OFR1a of the first region R1a thereof enter on the transmission path of the laser beam BL, and the filter wheel 130 rotates to make the third region R3 enter on the transmission path of the light beam coming from the first optical functional region OFR1a of the first region R1a of the wavelength conversion element 120a. In detail, after the laser beam BL is emitted by the laser light source 110, it sequentially passes through the lenses C1, C2, the beam splitting element 140, the lenses C3 to C6, and then is transmitted to the first optical functional region OFR1a. The laser beam BL penetrates the first optical functional region OFR1 so as to guide the laser beam BL to the first position P1 where the light valve 210 is located with the first optical path.

The first optical path is described in detail. After the laser beam BL penetrates the first optical functional region OFR1a, the laser beam BL sequentially penetrates the lenses C7 and C8, is reflected by the reflector RM1, penetrates the lens C9, is reflected by the reflector RM2, penetrates the lens C10, is reflected by the reflector RM2 again, penetrates the lens C10, is reflected by the reflector RM3 again, penetrates the lens C11, the beam splitting element 140 and the lens C12 to be transmitted to the third region R3 of the filter wheel 130. The laser beam BL penetrates the blue light filter 136 in the third region R3 so as to form a blue beam and be outputted to the illumination system 100. During this time interval, the blue beam is served as the illumination beam IB. The subsequent optical path of the illumination beam IB and the operation of the light valve 210 are similar to the optical path of the illumination beam IB of FIG. 3A, and will not be repeated here.

Please refer to FIG. 6B, in the second sub-time interval of the first time interval, the wavelength conversion element 120a makes the second optical functional region OFR2a of the first region R1a enters the transmission path of the laser beam BL. At this time, the third region R3 of the filter wheel 130 is still located on the transmission path of the light beam coming from the wavelength conversion element 120. After the laser beam BL is emitted by the laser light source 110, it penetrates the lenses C1, C2, the beam splitting element 140, the lenses C3 to C6, and then is transmitted to the second optical functional region OFR2a. The reflective element 126a in the second optical functional region OFR2a is used to guide the laser beam BL to the second position P2 different from the first position P1 with the second optical path.

The second optical path is described as follows in detail. After the laser beam BL is reflected by the reflective element 126a in the second optical functional region OFR2a, it returns to the laser light source 110 along the original optical path. The position of the laser light source 110 is, for example, the second position P2.

According to the above, that is to say, in the second sub-time interval for the light valve 210 to dissipate heat, the second optical functional region OFR2a of the wavelength conversion element 120a guides the laser beam BL, for example, by the reflection function thereof so as to make the laser beam BL transmit to a second position P2 that is different from the first position P1 where the light valve 210 is located, so the projection apparatus 200a does not have the problem of color point shift.

In the following paragraphs, the angle definitions of the wavelength conversion elements 120, 120a and the filter wheel of the above embodiment will be described in detail.

Please refer to FIG. 2A and FIG. 5, the wavelength conversion elements 120, 120a have a first central axis CAL The two boundaries of the first optical functional regions OFR1 and OFR1a respectively are connected to the first central axis CA1 to form two first extension lines ELL The two boundaries of the second optical functional regions OFR2 and OFR2a respectively are connected to the first central axis CA1 to form two second extension lines EL2. The two boundaries of the second region R2 respectively are connected to the first central axis CA1 to form two third extension lines EL3. The included angle between the two first extension lines EL1 is the first included angle θ1, the included angle between the two second extension lines EL2 is the second included angle θ2, and the included angle between the two third extension lines EL3 (obtuse angle)) is the third included angle θ3. Referring to FIG. 2B, the two boundaries of the fourth region R4 and the second central axis CA2 respectively are connected to form two fourth extension lines EL4, and the angle (obtuse angle) between the two fourth extension lines EL4 is the fourth included angle θ4.

According to the above, since the types of the wavelength conversion elements 120 and 120a are the first phosphor wheel and the second phosphor wheel, respectively, the first optical functional regions OFR1 and OFR1a (respectively with reflection function and (light-transmissive function) are the main optical functional regions of wavelength conversion elements 120 and 120a, so the first included angle θ1 is greater than the second included angle θ2. The second included angle θ2 falls within a range of 2 degrees to 15 degrees, for example, but the invention is not limited to this.

Taking the wavelength conversion element 120a of FIG. 5 as an example for illustration, in order to avoid the problem of color point shift, the magnitude of the distribution angle (i.e. the third included angle θ3 in the FIG. 5) of the wavelength conversion substance 122 (i.e, the second region R2) may also be designed to be the equal to the distribution angle (i.e. the included angle θ4 in the FIG. 2B) of the fourth region R4 (i.e. the fourth included angle θ4 in FIG. 2B), and the difference between the two included angles is replaced by the reflective element 126a, so when plurality micro lenses of the light valve 210 oscillate back and forth in the second time interval, the laser beam BL will be transmitted to the reflective element 126 and reflected by the reflective element 126 instead of being transmitted to the wavelength conversion substance 122, so as to avoid the problem of color point shift.

In other embodiments, take the wavelength conversion element 120a as an example for illustration. In order to avoid the problem of color point shift, the magnitude of distribution angle (θ3) of the wavelength conversion substance 122 (i.e, the second region R2) may be designed to be smaller than the magnitude of distribution angle of the fourth region R4 (θ4), and the difference between the two included angles can be replaced by a larger reflective element 126a. Therefore, when plurality micro lenses of the light valve 210 oscillate back and forth in the second time interval, the laser beam BL will not be transmitted to the wavelength conversion substance 122 but will be transmitted to the reflective element 126 and be reflected by the reflective element 126. The reflected laser beam BL can penetrate the beam splitting element 140, and is transmitted to the laser light source 110 (i.e the second position P2) to avoid the problem of color point shift.

In addition, in other embodiments, the projection apparatus may also be provided with a supplementary light source to supply a specific color of colored light at certain timings. For example, the supplementary light source can emit red light. Since the yellow light excited by the wavelength conversion substance 122 in the above embodiment may provides green light and red light at different timings, if the supplementary light source that can emit red light is added in the projection apparatus, then the distribution angle of the wavelength conversion substance 122 (that is, the third included angle θ3 in FIGS. 2A and 5) does not need to be so large. Alternatively, the wavelength conversion substance 122 may be used only to provide green light, that is, the third included angle θ3 may only be equal to the angle of the second sub-region SR2 (green light region).

Figure 7:
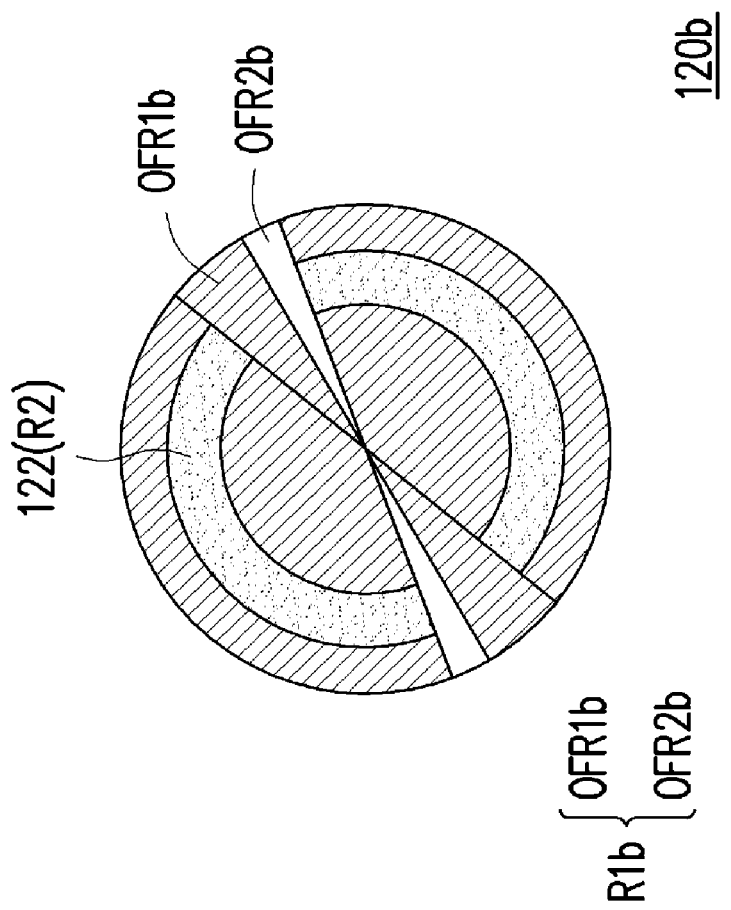
FIG. 7 is a schematic diagram of a wavelength conversion element according to another embodiment of the invention.

FIG. 7 is a schematic diagram of a wavelength conversion element according to another embodiment of the invention.

Please refer to FIG. 7, the wavelength conversion element 120b is substantially similar to the wavelength conversion element 120 of FIG. 2A, and the main difference is lies that: the number of the first and second optical functional regions OFR1b and OFR2b of the first region R1b of the wavelength conversion element 120b are respectively plural, and for example is two, but the invention is not limited to this.

In summary, in the projection apparatus of the embodiment of the present invention, in the first sub-time interval of the first time interval, the first optical function region of the wavelength conversion element guides the laser beam through the first optical path to the first position where the light valve is located, so that the light valve converts the laser beam into the image beam to realize the projection function. In the second sub-time interval of the first time interval, the second optical functional region of the wavelength conversion element guides the laser beam through the second optical path to the second position different from the position where the light valve located. The light valve can perform heat dissipation-related operations in the second sub-time interval, and the probability of color point shift is greatly reduced, so the projection apparatus has good image quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising an illumination system, a light valve and a projection lens, wherein:
   the illumination system is configured to output an illumination beam, the illumination system comprises a laser light source and a wavelength conversion element, wherein:
   the laser light source is configured to emit a laser beam; and
   the wavelength conversion element is disposed on a transmission path of the laser beam, and a first region of the wavelength conversion element comprises at least one first optical functional region and at least one second optical functional region;

the light valve is disposed on a transmission path of the illumination beam, and converts the illumination beam into an image beam; and the projection lens is disposed on a transmission path of the image beam, wherein, in a first sub-time interval of a first time interval, the first optical functional region of the wavelength conversion element enters the transmission path of the laser beam, and the first optical functional region guides the laser beam to a first position with a first optical path, wherein the light valve is located at the first position, and in a second sub-time interval of the first time interval, the second optical functional region of the wavelength conversion element enters the transmission path of the laser beam, and the second optical functional region guides the laser beam to a second position with a second optical path, wherein the second position is different from the first position.

2. The projection apparatus according to claim 1, the wavelength conversion element further has a second region, wherein, in a second time interval, the second region enters the transmission path of the laser beam, the second region converts the laser beam into a converted beam, and the converted beam is served as the illumination beam.

3. The projection apparatus according to claim 2, wherein the first region is a blue region, and the second region is a yellow region.

4. The projection apparatus according to claim 2, wherein the illumination system further comprises a filter wheel being disposed on a transmission path of a light beam coming from the wavelength conversion element, the filter wheel has a third region and a fourth region, the third region corresponds to the first region, and the fourth region corresponds to the second region.

5. The projection apparatus according to claim 4, wherein the wavelength conversion element has a first central axis, and the filter wheel has a second central axis, two boundaries of the second region are respectively connected to the first central axis to form two third extension lines, and an included angle between the two third extension lines is a third included angle, two boundaries of the fourth region are respectively connected to the second central axis to form two fourth extension lines, and an included angle between the two fourth extension lines is a fourth included angle, wherein the third included angle is equal to the fourth included angle.

6. The projection apparatus according to claim 4, wherein the fourth region further comprises a first sub-region and a second sub-region, wherein the third region is a blue region, the first sub-region is a red region, and the second sub-region is a green region.

7. The projection apparatus according to claim 1, wherein in the first sub-time interval of the first time interval, a plurality of micro lenses in the light valve are respectively subjected to an image control signal to determine deflection status thereof.

8. The projection apparatus according to claim 1, wherein in the second sub-time interval of the first time interval, a plurality of micro lenses in the light valve are not controlled by an image control signal and oscillate back and forth respectively.

9. The projection apparatus according to claim 1, wherein the wavelength conversion element is a first wavelength conversion element, and the first optical functional region is a light reflection region, and the second optical functional region is a light penetrating region.

10. The projection apparatus according to claim 1, wherein the wavelength conversion element is a second wavelength conversion element, and the first optical functional region is light penetrating region, the second optical functional region is a light reflecting region.

11. The projection apparatus according to claim 1, wherein the wavelength conversion element has a first central axis, wherein two boundaries of the first optical functional region respectively connect to the first central axis to form two first extension lines, and two boundaries of the second optical functional region respectively connect to a second central axis to form two second extension lines, and an included angle included by the two first extension lines is a first included angle, an included angle included by the two second extension lines is a second included angle, the first included angle is greater than the second included angle.

12. The projection apparatus according to claim 11, wherein the range of the second included angle falls within a range of 2 degrees to 15 degrees.

13. The projection apparatus according to claim 11, wherein the illumination system further comprises a filter wheel being disposed on a transmission path of a light beam coming from the wavelength conversion element, the filter wheel has a third region and a fourth region, the third region corresponds to the first region, and the fourth region corresponds to the second region.

14. The projection apparatus according to claim 1, wherein the number of the at least one first optical functional region and the at least one second optical functional region are respectively plural.

15. The projection apparatus according to claim 1, further comprising:

a light homogenizing element, disposed on the transmission path of the illumination beam and located between the illumination system and the light valve.

16. The projection apparatus according to claim 1, wherein a fourth region further comprises a first sub-region and a second sub-region, wherein a third region is a blue region, the first sub-region is a red region, and the second sub-region is a green region.

* * * * *